United States Patent Office 3,756,942
Patented Sept. 4, 1973

3,756,942
PROCESS FOR THE PRODUCTION OF
AROMATIC COMPOUNDS
John Cattanach, Camberley, England, assignor to
Mobil Oil Corporation
No Drawing. Continuation-in-part of appplication Ser.
No. 153,855, June 16, 1971. This application May 17,
1972, Ser. No. 253,942
Int. Cl. C10g 35/06
U.S. Cl. 208—137               15 Claims

ABSTRACT OF THE DISCLOSURE

A process for the preparation of aromatic compounds in high yields is set forth which involves contacting a particular feed consisting essentially of mixtures of paraffins, and/or olefins, and/or naphthenes with a crystalline aluminosilicate of the ZSM–5 type under conditions of temperature and space velocity such that a significant portion of the feed is converted directly into aromatic compounds.

RELATED APPLICATION

This application is a continuation-in-part of Ser. No. 153,855, filed June 16, 1971.

BACKGROUND OF THE INVENTION

It has long been known to contact various hydrocarbon fractions with acidic catalysts generally and in particular with solid siliceous acidic catalysts, including those referred to as crystalline aluminosilicate zeolites. Contact of said hydrocarbon feeds with said acid catalysts was carried out over a wide variety of reactions, including cracking, isomerization, hydrocracking, etc. Representative United States patents disclosing and claiming contacting of various hydrocarbon fractions with crystalline aluminosilicates include U.S. Pats. 3,140,249; 3,140,251; 3,140,253 and 3,140,322. The contact of paraffinic and olefinic feedstocks with crystalline aluminosilicate zeolites is also known in the art and by far the primary reason for contacting these materials with zeolites has been for the purpose of cracking them, i.e. converting them to lower molecular weight compounds.

However, irrespective of the particular expressed purposes for contacting various hydrocarbon feed materials with crystalline aluminosilicate zeolites, the simple fact remains that the art has long recognized that aromatic compounds are formed. Thus, for example, in the catalytic cracking of gas oils over zeolite catalysts to produce a product boiling in the motor fuel range, workers skilled in the art have recognized tht some production of aromatic compounds did, in fact, occur.

Additionally, there have been instances in the prior art when hydrocarbon feed materials have been contacted with crystalline aluminosilicate zeolites for the very specific purpose of forming aromatic compounds rather than obtaining them as by-products in reactions such as catalytic cracking. An example of a patent directed specifically towards the preparation of aromatic compounds from hydrocarbon feed materials by contacting the same with a crystalline aluminosilicate zeolite is Canadian Pat. 822,162 which issued Sept. 2, 1969.

However, although it was known that hydrocarbon feed materials such as paraffins could be converted directly into aromatics over an acidic catalyst including crystalline alumino-silicate zeolites, the simple fact remains that none of the prior art processes was capable of carrying out this desired reaction in such a way as to obtain a sustained significant yield of desired aromatic compounds in the absence of substantial added hydrogen. Thus, although the particular reaction with which this application is directed, i.e. the formation of aromatics from paraffins, olefins or naphthenes, has long been known in the art, it can be stated that such prior art processes were of academic interest only since they contained so many inherent disadvantages which prevented them from becoming viable commercial operations.

DESCRIPTION OF THE INVENTION

This invention is concerned with the production of aromatic compounds from a specific type of feed material containing paraffins and/or olefins and/or naphthenes by contacting said feed material with a ZSM–5 type crystalline aluminosilicate such that at least 30 pounds of aromatic compounds are produced per 100 pounds of said feed material which is charged. Thus, this invention is concerned with a process which will allow production of aromatic compounds in the amount of at least 30 weight percent based on the paraffins, olefins, and naphthenes which are charged. In the preferred embodiment of this invention conversion to aromatic compounds is possible in amounts greater than 40 and 50 weight percent based on the feed material charged. It should become immediately apparent that this invention is not directed towards a reaction which has academic interest only, but rather, is directed towards a novel method for producing aromatic compounds at high selectivities.

The feed material which is employed in the novel process of this invention consists essentially of liquid paraffins, olefins, naphthenes, and mixtures thereof which have a boiling point in the range of from $C_5$ up to those fractions wherein at least 50 volume percent boils no higher than 250° F. The preferred feed materials are those liquid hydrocarbons which have a boiling point of from $C_5$ through 210° F. The feed materials which are employed in the novel process of this invention are critical from the point of view of attempting to produce a process which has the potential for commercialization. In general, the feed materials which are employed are those which have a comparatively low economic value and the novel process of this invention allows them to be upgraded into aromatics which obviously enhance their economic importance. Additionally, the composition of the feed material is also critical from another point of view and that is the optimization of the aromatic compounds which are produced. In this connection, the novel process of this invention is a highly endothermic one which means that a considerable expense is required in order to impart heat thereto. The maximum utilization of the heat energy required to preheat the feed material occurs when the charge material is composed essentially of those elements which are capable of being aromatized. In this connection, it is to be specifically noted that aromatic compounds are substantially inert under the reaction conditions contemplated for the process of this invention. Thus, any aromatic compound present in the feed material would merely act as a diluent and pass through the process of this invention unchanged.

It therefore appears that it would be an economic liability to have aromatics present in the feed material for the simple reason that energy would have to be expended in order to heat said aromatics to the temperatures contemplated in the novel process of this invention and yet they are substantially inert at the reaction conditions chosen. For this reason, it is particularly important that the aromatic content of the feed material be extremely limited so as to avoid paying an economic penalty. Therefore, it is to be understood that the feed material in the novel process of this invention is one which does not contain any more than about 15 weight percent of aromatic compounds. Thus, the expression consisting essentially of paraffins, and/or olefins and/or naphthenes, as used throughout this specification and claims, is intended to include feedstocks which contain up to about 15 weight percent aromatics. Quite obviously, the preferred feed materials are those which contain substantially less aromatics and even more desirably, those which are substantially free of aromatics.

Typical refinery feedstocks which can be utilized in accordance with this invention include Udex raffinates, coker gasoline, light F.C.C. gasoline, as well as $C_5$ to $C_7$ fractions of straight run naphthas, and pyrolysis gasoline.

The novel process of this invention is carried out by contacting a liquid feed material, above described, with a ZSM-5 type zeolite under conditions of space velocity and temperature such that at least 30 weight percent of the non-aromatic portion of the charge stock is converted to aromatic compounds. The space velocity at which this reaction is carried out is also a critical parameter from a practical point of view. In this connection, it has been found that the space velocities which must be used are from 1 to 15 WHSV. The reason that the process of this invention operates within the ranges of space velocities above set forth is directly related to the fact that this process bridges the gap between an academic curiosity and practical reality. This process at a space velocity lower than 1 WHSV simply is not attractive from a commercial point of view due to the fact that an unduly long time is required in order to obtain any usable product from a given reactor capacity. As is well known, the lower the space velocity, the longer it takes for a given reactor to produce a given weight of desired product. Therefore, the lower limit of space velocity with which this process is concerned is an WHSV of 1. The reason for the upper limit of 15 WHSV is both an economic reason as well as a practical scientific reason. As is heretofore been stated, the novel process of this invention is a highly endothermic one and by definition requires the input of a substantial amount of heat. At space velocities in excess of about 15 WHSV, it is not practical to impart the heat necessary to carry out the reaction and obtain the desired high yields of aromatics. Additionally, as the reaction is carried out at higher space velocities, the products are shifted towards olefins rather than the desired aromatics.

This process is operable at pressures ranging from atmospheric pressure up to about 35 atmospheres. It is possible to carry out this reaction at pressures higher than 35 atmospheres but such would require the use of expensive high pressure equipment which would tend to detract from the overall economics of operation.

Additionally, if a moving catalyst bed is used, then the space velocities employed are those which give contact times equivalent to those which are obtained at space velocities of 1 to 15 WHSV for a fixed bed. These relationships are well known in the art and it is critical in the novel process of this invention that they be maintained within the areas above set forth.

However, the most preferred embodiment of this invention is operating at a pressure of 1 to 10 atmospheres and a space velocity of 1 to 10 WHSV. The temperature at which the novel process of this invention is carried out is extremely critical and is dependent to a large extent upon the particular composition of the feed material which is being charged to the catalyst. It has been discovered that there are certain minimum critical temperatures which must be employed in order to obtain the desired reaction and that these minimum temperatures have absolutely nothing to do with the concept of percent of conversion of the feed material but have everything to do with the selectivity of the conversion of the feed material to aromatics. It has been discovered that if a feedstock contains at least 35 weight percent of olefins, then the minimum critical temperature which must be employed is 650° F. If the feed material contains less than 35 weight percent of olefins, then the minimum temperature which must be employed in 850° F.

Without wishing to be bound by any theory of operation, nevertheless, it appears that the novel process of this invention involves mechanistically a two-step reaction in that it involves converting the charge stock to intermediate products and then catalyzing the aromatization of the intermediate products to the desired final products. By way of considerable oversimplification, it has been found that generally for any given feed material with which this invention is concerned, the temperature which is required to form the intermediate products at practical rates is lower than the temperature which is required to make aromatics from said intermediate products at practical rates.

Thus, in carrying out the novel process of this invention, it is absolutely critical that the non-aromatic portion of the feedstock must be converted in amounts of at least 90 weight percent and more preferably 100 weight percent. As pointed out supra, the process of this invention is at least two-step and unless a substantial portion of the feed is converted in the first step, no significant yields of aromatic compounds will be obtained. However, this criterion in and of itself does not result in the formation of the aromatic compounds with which this invention is concerned. This invention utilizes conditions of severity which are greater than those required for converting 90% of the non-aromatic portion of the charge stock and even more preferably greater than those required to convert 100% of the non-aromatic portion of the charge stock. It is only when operating at these severities that it is possible to produce aromatics in high yields when employing a zeolite catalyst of the ZSM-5 type.

The upper limit of temperature is not narrowly critical and any practical upper maximum can be used which does not present problems with respect to heat input nor drive the reaction so that the thermal cracking overrides the catalytic conversion. In this connection, it has been found that a practical upper limit of temperature is about 1400° F. It is preferred, however, to carry out the conversion of those liquid hydrocarbon feedstocks having a paraffin content of at least 65 weight percent at temperatures ranging from about 900 to 1200° F. For feed materials containing less than 65% paraffins, the preferred temperatures range from about 750° to about 1200°.

Another important process parameter in carrying out the novel process of this invention resides in the fact that this reaction must be conducted in the absence of substantial added hydrogen. For reasons which are not completely understood, it appears that the addition of added hydrogen in substantial amounts affects the ability of the ZSM-5 type catalyst to catalyze the aromatization reactions so that an overall diminution of the catalytic activity of these materials is experienced. Therefore, it is definitely preferred in carrying out the process of this invention that no added hydrogen be employed. It is immediately noted that hydrogen is a by-product of the aromatization reaction and, as such, there is always some hydrogen present during the course of the reaction. The hydrogen which is formed during the reaction is not adverse to the aromatization reaction but the aforementioned diminution in activity is only found to occur when substantial amounts of added hydrogen are used. It might very well be, however, that it is possible to add small amounts of hydrogen so as to minimize the coke forming tendency of the catalyst and thereby prolong catalyst life. However, the preferred embodiment of this invention resides in carrying out said aromatization reaction in the absence of added hydrogen.

As has heretofore been pointed out, the novel process of this invention is carried out by contacting a specific liquid hydrocarbon feed at the aforementioned temperatures, space velocities and pressures with a family of crystalline aluminosilicate zeolites identified as those of the ZSM-5 type. For reasons which are not completely understood, it appears that this family of zeolites is unique to all other zeolites in their ability to catalyze aromatization reactions in high yields, i.e. at least 30 weight percent based on the non-aromatic portion of the feedstock for any useful length of time.

ZSM-5 type zeolites which are employed in the process of this invention include not only ZSM-5 but also ZSM-8 and ZSM-11 zeolites.

ZSM-5 is disclosed and claimed in copending application Ser. No. 865,472, filed Oct. 10, 1969; ZSM-8 is disclosed and claimed in copending application Ser. No. 865,418, filed Oct. 10, 1969 and ZSM-11 is disclosed and claimed in copending application Ser. No. 31,421, filed Apr. 23, 1970.

The family of ZSM-5 compositions has the characteristic X-ray diffraction pattern set forth in Table 1 hereinbelow. ZSM-5 compositions can also be identified, in terms of mole ratios of oxides, as follows:

$$0.9 \pm 0.2 M_{2/n}O : W_2O_3 : bYO_2 : zH_2O$$

wherein M is a cation, $n$ is the valence of said cation, W is selected from the group consisting of aluminum and gallium, Y is selected from the group consisting of silicon and germanium, $z$ is from 0 to 40 and $b$ is at least 5 and preferably 15-300. In a preferred synthesized form, the zeolite has a formula, in terms of mole ratios of oxides, as follows:

$$0.9 \pm 0.2 M_{2/n}O : Al_2O_3 : 15-100 SiO_2 : zH_2O$$

and M is selected from the group consisting of a mixture of alkali metal cations, especially sodium, and tetraalkylammonium cations, the alkyl groups of which preferably contain 2-5 carbon atoms.

In a prefered embodiment of ZSM-5, W is aluminum, Y is silicon and the silica/alumina mole ratio is at least 15, preferably at least 30.

Members of the family of ZSM-5 zeolites which include ZSM-5, ZSM-8 and ZSM-11 possess a definite distinguishing crystalline structure whose X-ray diffraction pattern shows the following significant lines:

TABLE 1

| Interplanar spacing $d$ (A.) | Relative intensity |
|---|---|
| 11.1±0.2 | S |
| 10.0±0.2 | S |
| 7.4±0.15 | W |
| 7.1±0.15 | W |
| 6.3±0.1 | W |
| 6.04±0.1 | W |
| 5.97±0.1 | W |
| 5.56±0.1 | W |
| 5.01±0.1 | W |
| 4.60±0.08 | W |
| 4.25±0.08 | W |
| 3.85±0.07 | VS |
| 3.71±0.05 | S |
| 3.64±0.05 | M |
| 3.04±0.03 | W |
| 2.99±0.02 | W |
| 2.94±0.02 | W |

These values, as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these the relative intensities, $100 I/I_o$, where $I_o$ is the intensity of the strongest line or peak, and $d$ (obs.), the interplanar spacing in A., corresponding to the recorded lines, were calculated. In Table 1 the relative intensities are given in terms of the symbols S=strong, M=medium, MS=medium strong, MW=medium weak and VS=very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

Zeolite ZSM-5 can be suitably prepared by preparing a solution containing water, tetrapropyl ammonium hydroxide and the elements of sodium oxide, an oxide of aluminum or gallium and an oxide of silica, and having a composition, in terms of mole ratios of oxides, falling within the following ranges:

TABLE

| | Broad | Preferred | Particularly preferred |
|---|---|---|---|
| OH⁻/SiO₂ | 0.07–1.0 | 0.1–0.8 | 0.2–0.75 |
| R₄N⁺/(R₄N⁺+Na⁺) | 0.2–0.95 | 0.3–0.9 | 0.4–0.9 |
| H₂O/OH⁻ | 10–300 | 10–300 | 10–300 |
| YO₂/W₂O₃ | 5–100 | 10–60 | 10–40 | wherein R is propyl, W is aluminum and Y is silicon. This mixture is maintained at reaction conditions until the crystals of the zeolite are formed. Thereafter the crystals are separated from the liquid and recovered. Typical reaction conditions consist of a temperature of from about 75° C. to 175° C. for a period of about six hours to 60 days. A more preferred temperature range is from about 90 to 150° C., with the amount of time at a temperature in such range being from about 12 hours to 20 days.

The digestion of the gel particles is carried out until crystals form. The solid product is separated from the reaction medium, as by cooling the whole to room temperature, filtering and water washing.

ZSM-5 is preferably formed as an aluminosilicate. The composition can be prepared utilizing materials which supply the elements of the appropriate oxide. Such compositions include, for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed.

ZSM-8 can also be identified, in terms of mole ratios of oxides, as follows:

$$0.9 \pm 0.2 M_{2/n}O : Al_2O_3 : 15-300 SiO_2 : zH_2O$$

wherein M is at least one cation, $n$ is the valence thereof and $z$ is from 0 to 40. In a preferred synthesized form, the zeolite has a formula, in terms of mole ratios of oxides, as follows:

$$0.9 \pm 0.2 M_{2/n}O : Al_2O_3 : 15-60 SiO_2 : zH_2O$$

and M is selected from the group consisting of a mixture of alkali metal cations, especially sodium, and tetraethylammonium cations.

Zeolite ZSM-8 can be suitably prepared by reacting a water solution containing either tetraethylammonium hydroxide or tetraethylammonium bromide together with the elements of sodium oxide, aluminum oxide, and an oxide of silica.

The operable relative proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. Pat. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following ranges:

$SiO_2/Al_2O_3$—from about 10 to about 200

$Na_2O$/tetraethylammonium hydroxide—from about 0.05 to .020

Tetraethylammonium hydroxide/$SiO_2$—from about 0.08 to 1.0

$H_2O$/tetraethylammonium hydroxide—from about 80 to about 200

Thereafter, the crystals are separated from the liquid and recovered. Typical reaction conditions consist of maintaining the foregoing reaction mixture at a temperature of from about 100° C. to 175° C. for a period of time of from about six hours to 60 days. A more preferred temperature range is from about 150 to 175° C. with the amount of time at a temperature in such range being from about 12 hours to 8 days.

ZSM-11 can also be identified, in terms of mole ratios of oxides, as follows:

$$0.9 \pm 0.3 M_{2/n}O : Al_2O_3 : 20-90 SiO_2 : zH_2O$$

wherein M is at least one cation, $n$ is the valence thereof and $z$ is from 6 to 12. In a preferred synthesized form, the zeolite has a formula, in terms of mole ratios of oxides, as follows:

$$0.9 \pm 0.3 M_{2/n}O : Al_2O_3 : 20-90 SiO_2 : zH_2O$$

and M is selected from the group consisting of a mixture of alkali metal cations, especially sodium, and tetrabutylammonium cations.

ZSM-11 can be suitably prepared by preparing a solution containing $(R_4X)_2O$, sodium oxide, an oxide of aluminum or gallium, an oxide of silicon or germanium and water and having a composition, in terms of mole ratios of oxides, falling within the following ranges:

|  | Broad | Preferred |
|---|---|---|
| $YO_2/WO_2$ | 10–150 | 20–90 |
| $Na_2O/YO_2$ | .05–0.7 | 0.05–0.40 |
| $(R_4X)_2O/YO_2$ | 0.02–0.20 | 0.02–0.15 |
| $H_2O/Na_2O$ | 50–800 | 100–600 | wherein $R_4X$ is a cation of a quaternary compound of an element of Group 5–A of the Periodic Table, W is aluminum or gallium and Y is silicon or germanium maintaining the mixture until crystals of the zeolite are formed. Preferably, crystallization is performed under pressure in an autoclave or static bomb reactor. The temperature ranges from 100° C.–200° C. generally, but at lower temperatures, e.g. about 100° C., crystallization time is longer. Thereafter the crystals are separated from the liquid and recovered. The new zeolite is preferably formed in an alumino-silicate form.

The ZSM–5 type family of zeolites have preferably at least a portion of the original cations associated therewith replaced by a wide variety of other cations according to techniques well known in the art. Typical replacing cations would include hydrogen, ammonium, and metal cations, including mixtures of the same. Of the replacing cations, preference is given to cations of hydrogen, ammonium, rare earth, magnesium, zinc, calcium, nickel, and mixtures thereof. Particularly effective members of the ZSM–5 type family of zeolites are those which have been base exchanged with hydrogen ions, ammonium ions, zinc ions or mixtures thereof.

Typical ion exchange techniques would be to contact a ZSM–5 type of zeolite with a salt of the desired replacing cation or cations. Although a wide variety of salts can be employed, particular preference is given to chlorides, nitrates and sulfates.

Representative ion exchange techniques are disclosed in a wide variety of patents, including U.S. Pats. 3,140,-249; 3,140,251; and 3,140,253.

It is also within the scope of the novel process of this invention to incorporate a desired metallic component onto the ZSM–5 type family of zeolites by techniques other than ion exchange. Thus, for example, it is possible to impregnate a desired metallic component such as zinc, platinum or palladium by conventional impregnation techniques, as well as merely depositing the elemental metal onto the particular zeolite and in some cases such as with zinc oxide, to incorporate the metal by physical admixture of the zeolite with an insoluble metal compound.

In any event, following contact with the salt solution of the desired replacing cation, the zeolites are preferably washed with water and dried at a temperature ranging from 150° to about 600° F. and thereafter heated in air or inert gas at temperatures ranging from about 500° F. to 1500° F. for periods of time ranging from 1 to 48 hours or more. It is noted that this heat treatment can be carried out in situ, i.e. while the particular aromatization reaction is taking place, but it is desired to carry out as a separate step prior to carrying out the aromatization reaction.

An embodiment of this invention resides in the use of a porous matrix together with the ZSM–5 type family of zeolite previously described. The zeolite can be combined, dispersed, or otherwise intimately admixed with the porous matrix in such proportions that resulting products contain from 1 to 95% by weight and preferably from 10 to 70% by weight of the zeolite in the final composite.

The term "porous matrix" includes inorganic compositions of which the zeolites can be combined, dispersed or otherwise intimately admixed wherein the matrix may be catalytically active or inactive. It is to be understood that the porosity of the composition employed as a matrix can be either inherent in the particular material or it can be introduced by mechanical or chemical means representative of matrices which can be employed include metals and alloys thereof, sintered metals, and sintered glass, asbestos, silicon carbide, aggregates, pumice, firebrick, diatomaceous earths, alumina and inorganic oxides. Inorganic compositions, especially those comprising alumina and those of a siliceous nature are preferred. Of these matrices inorganic oxides such as clay, chemically treated clays, silica, silica alumina, etc., as well as alumina, are particularly preferred because of their superior porosity attrition resistance and stability.

Techniques for incorporating into the ZSM–5 type family of zeolites into a matrix are conventional in the art and are set forth in U.S. Pat. 3,140,253.

It is to be noted that when a ZSM–5 type zeolite is used in combination with a porous matrix, space velocities previously set forth as parameters for this process are based on the ZSM–5 type zeolite alone and the porous matrix is ignored. Thus, whether a ZSM–5 type zeolite is used alone or in a porous matrix, the space velocities in all cases refer to the ZSM–5 type component.

The following examples will now illustrate the best mode contemplated for carrying out this invention.

Examples 1–6

These examples will show what happens when n-hexane is contacted with a ZSM–5 catalyst at various space velocities and at various temperatures. Examples 1–5 were carried out at 800° F.—a temperature below the critical minimum necessary for normal paraffins. Example 6 was carried out at 1000° F. In all cases the catalyst employed was H–ZSM–5 and all runs were carried out at atmospheric pressure and in the absence of added hydrogen. The results of said experiments are shown in the following table.

TABLE

| Example | 1 | 2 | 3 | 4 | 5 | 6 |
|---|---|---|---|---|---|---|
| Temperature, °F | 800 | 800 | 800 | 800 | 800 | 1,000 |
| WHSV | 1 | 3.1 | 0.22 | 5.7 | 0.07 | 1 |
| Time at condition | 10 | 60 | 60 | 20 | 60 | 46 |
| Time on stream (min.) | 10 | 92 | 156 | 219 | 311 | 417 |
| Total product dist., wt. percent: | | | | | | |
| $C_1$ | 1.5 | 0.5 | 5.7 | 0.2 | 21.5 | 17.2 |
| $O_2$ [a] | | 0.1 | | 0.4 | | 1.4 |
| $C_2$ | 4.2 | 2.0 | 9.5 | 2.0 | 21.5 | 16.3 |
| $O_3$ | | | | | | |
| $C_3$ | 66.1 | 52.7 | 64 | 45.8 | 38.7 | 16.7 |
| Iso-$C_4$ | 5.5 | 13.3 | 1.1 | 14.4 | | |
| Iso- and 1-$O_4$ | | 0.2 | | 0.4 | | |
| N–$C_4$ | 6.1 | 11.6 | 0.7 | 14.5 | | |
| Trans-$O_4$ | | | | | | |
| Cis-$O_4$ | | | | | | |
| Iso-$C_5$ | 0.6 | 2.6 | | 4.1 | | |
| 1–$O_5$ | | | | | | |
| N–$C_5$ | | 0.5 | | 1.6 | | |
| 2–$O_5$ | | | | 0.07 | | |
| 2,2-DM–$C_4$ | | | | | | |
| Cyclo-$C_5$ | | | | | | |
| 2,3-DM–$C_4$ | | | | 0.03 | | |
| 2–M–$C_5$ | | 0.05 | | 0.4 | | |
| 3–M–$C_5$ | | 0.1 | | 0.7 | | |
| 1–$O_6$ | | | | | | |
| N–$C_6$ | | | | 1.3 | | |
| 2–$O_6$ | | | | | | |
| M-Cyclo-$C_5$ | | | | 0.2 | | |
| $C_6H_6$ | 2.6 | 1.7 | 4.3 | 1.4 | 1.1 | 16.8 |
| Cyclo-$C_6$ | | | | | | |
| $C_7$'s | | | | | | |
| N–$C_7$ | | | | | | |
| Toluene | 7.9 | 6.6 | 9.7 | 5.5 | 3.7 | 20.9 |
| $C_8$'s | | | | | | |
| N–$C_8$ | | | | | | |
| Et-$C_6H_5$ | 0.1 | 0.3 | | 0.3 | | 0.3 |
| M-p-xylene | 3.8 | 4.4 | 4.1 | 3.9 | 5.3 | 6.4 |
| o-Xylene | 0.8 | 1.1 | 0.8 | 1.2 | 2.1 | 1.9 |
| $C_9$'s | | | | | | |
| $C_9$'s Ar | 0.3 | 2.0 | | 1.6 | | 0.6 |
| $C_{10}$–$C_{12}$ | | | | | | |
| $C_{10}$–$C_{12}$ Ar | | | | | | |
| $C_{12}+$'s | | | | | | |
| $C_{12}+$'s Ar | 0.5 | 0.2 | 0.2 | TB | 6 | 1.7 |
| Total, Wt. percent conversion | 100 | 100 | 100 | 98.7 | 100 | 100 |
| Wt. percent Ar made/100 gm. charge | 16 | 16.3 | 19.1 | 13.9 | 18.2 | 48.6 |

[a] In the above table "O"=olefin.

From the above table, it can be seen that in no case in Examples 1–5 was it possible to obtain high yields of aromatics at 800° F. no matter what space velocity was employed. Conversely, Example 6 produced almost 50% of aromatics. In all of Examples 1–6 substantially 100% conversion of normal hexane was experienced. These examples dramatically illustrate the vast difference in selectivity when conditions are utilized which fall within and without the operating parameters of this invention.

Examples 7–12

The following examples will illustrate the conversion of a light naphtha at various space velocities and at different hydrocarbon pressure.

In all cases the catalyst used was H–ZSM–5 in an alumina matrix (35 wt. percent alumina). The experiments were carried out at 1022° F. and in the absence of added hydrogen.

The feed material was a $C_6$-200° F. naphtha which analyzed as follows in wt. percent:

| | |
|---|---|
| Pentene | 0.02 |
| $C_6$ isoparaffins | 16.75 |
| n-Hexane | 18.95 |
| Cyclohexane | 8.65 |
| Methylcyclopentane | 12.77 |
| Hexene | 0.81 |
| Cyclohexene | 1.51 |
| $C_7$ isoparaffins | 23.25 |
| $C_7$ cyclopentane | 6.02 |
| n-Heptane | 6.96 |
| Benzene | 2.84 |
| Toluene | 1.48 |

The results obtained, as well as additional operating conditions are shown in the following table:

TABLE

| Example | 7 | 8 | 9 | 10 | 11 | 12 |
|---|---|---|---|---|---|---|
| P.s.i.g. | 150 | 150 | 150 | 150 | 0 | 0 |
| LHSV | 1.0 | 4.8 | 9.6 | 19.2 | 0.5 | 1.0 |
| WHSV | 1.3 | 5.8 | 11.6 | 23.1 | 0.6 | 1.3 |
| Wt. percent on charge: | | | | | | |
| Hydrogen | 0.7 | 0.4 | 0.4 | 0.4 | 1.4 | 1.0 |
| Methane | 17.8 | 5.2 | 5.5 | 2.2 | 8.3 | 6.4 |
| Ethane | 21.1 | 9.4 | 9.6 | 8.3 | 10.2 | 8.8 |
| Ethylene | 0.3 | 0.9 | 1.0 | 1.0 | 2.9 | 3.6 |
| Propane | 8.3 | 33.4 | 32.7 | 32.8 | 23.5 | 29.0 |
| Butanes | 0.7 | 3.8 | 3.6 | 4.8 | 1.7 | 2.9 |
| $C_3$–$C_4$ olefins | 0.2 | 5.1 | 5.1 | 6.7 | 3.1 | 6.2 |
| $C_5$+ non-aromatics | 0.1 | 4.1 | 4.1 | 6.1 | 0.3 | 1.4 |
| Benzene | 9.8 | 4.5 | 4.3 | 4.2 | 11.3 | 9.0 |
| Toluene | 16.7 | 12.5 | 12.2 | 11.6 | 19.8 | 16.0 |
| $C_8$ aromatics | 10.9 | 12.4 | 12.2 | 11.9 | 11.3 | 10.4 |
| $C_9$ aromatics | 2.3 | 5.4 | 6.0 | 5.3 | 2.3 | 2.1 |
| $C_{10}$+ mono-aromatics | 0.6 | 0.8 | 0.5 | 1.1 | 0.6 | 0.3 |
| Dicyclics | 11.2 | 4.0 | 4.5 | 3.9 | 4.4 | 2.5 |
| Yield of aromatics (g./100 g. of charge) | 47.1 | 35.3 | 35.4 | 33.7 | 45.4 | 35.8 |

The above table shows the production of aromatics in high yields. Note that as the space velocity increased more olefins were formed.

Examples 13–26

These examples will illustrate the process of this invention utilizing a $C_5$-230° F. light Coastal F.C.C. gasoline as a feed material.

In addition, these examples will show the improved results which are obtained when a zinc-H–ZSM–5 is used as opposed to H–ZSM–5.

All experiments were carried out in the absence of added hydrogen utilizing the same feed which analyzed as follows:

$C_5$-230° F. light Coastal F.C.C. gasoline:   Wt. percent

| | |
|---|---|
| $C_4$– | 0.4 |
| Isopentane | 8.3 |
| Pentenes | 13.6 |
| n-Pentane | 1.7 |
| Heptanes | 8.6 |
| Octanes | 3.4 |
| Cycloparaffins | 14.6 |
| $C_6$+ olefins | 26.9 |
| Benzene | 1.8 |
| Toluene | 7.8 |
| $C_8$+ aromatics | 0.8 |
| | 99.6 |

$C_5$+:

| | |
|---|---|
| Paraffins | 33.7 |
| Olefins | 40.5 |
| Naphthenes | 14.6 |
| Aromatics | 10.4 |

The experiments were carried out at atmospheric pressure and at various temperatures and space velocities and were used to show their effect on the products obtained.

Examples 13–18 and 22–26 were carried out using H–ZSM–5 mixed with 35 weight percent alumina.

Examples 19–21 were carried out using Zn H–ZSM–5 mixed with 35 weight percent alumina.

The results obtained are shown in the following table:

TABLE

| Example | 13 | 14 | 15 | 16 | 17 | 18 | 19 | 20 | 21 | 22 | 23 | 24 | 25 | 26 |
|---|---|---|---|---|---|---|---|---|---|---|---|---|---|---|
| Temperature, °F | 1,022 | 1,022 | 1,022 | 1,022 | 1,022 | 1,022 | 1,022 | 1,022 | 2,022 | 734 | 734 | 734 | 734 | 734 |
| WHSV | 23.9 | 9.7 | 2.0 | 2.0 | 0.95 | 0.15 | 5.8 | 3.5 | 1.8 | 21.8 | 9.1 | 4.0 | 1.8 | 1.8 |
| Products, wt. percent: | | | | | | | | | | | | | | |
| Methane | 2.8 | 3.6 | 10.8 | 12.3 | 14.4 | 16.9 | 2.1 | 3.3 | 4.7 | 0.9 | 0.7 | 1.0 | 0.7 | 0.6 |
| Ethane plus ethylene | 9.4 | 13.5 | 13.5 | 12.3 | 15.4 | 14.8 | 7.1 | 9.8 | 8.8 | 7.8 | 3.2 | 3.4 | 2.6 | 2.3 |
| Propane | 11.0 | 26.4 | 17.4 | 19.8 | 10.1 | 2.9 | 9.3 | 12.8 | 10.2 | 6.5 | 16.9 | 25.9 | 23.1 | 22.2 |
| Butanes | 7.1 | 5.6 | 2.4 | 0.4 | 0.1 | 0.3 | 6.6 | 2.6 | 0.9 | 7.8 | 9.1 | 12.4 | 9.1 | 11.5 |
| $C_3$–$C_4$ olefins | 19.2 | 4.1 | 0.6 | 0.9 | 0.1 | 0.9 | 13.7 | 3.7 | 2.7 | 11.9 | 10.9 | 4.8 | 2.6 | 4.0 |
| $C_5$+ nonaromatics | 22.1 | 9.1 | 1.8 | 0.3 | 0.1 | 0.1 | 20.9 | 2.6 | 0.2 | 39.7 | 21.4 | 12.8 | 9.6 | 16.4 |
| Benzene | 4.4 | 6.4 | 9.2 | 14.3 | 19.2 | 21.0 | 5.9 | 11.3 | 14.0 | 2.9 | 4.9 | 4.9 | 4.9 | 4.4 |
| Toluene | 11.9 | 16.2 | 19.7 | 20.6 | 22.1 | 17.1 | 17.4 | 26.0 | 28.2 | 10.5 | 15.3 | 15.3 | 14.9 | 15.0 |
| $C_8$ aromatics | 8.2 | 11.0 | 12.5 | 10.2 | 6.8 | 4.8 | 11.6 | 15.5 | 15.3 | 6.8 | 10.6 | 11.8 | 12.2 | 11.5 |
| $C_9$ aromatics | 2.0 | 1.9 | 2.9 | 2.7 | 1.4 | 0.7 | 1.8 | 2.3 | 2.4 | 2.7 | 3.8 | 4.4 | 4.9 | 4.3 |
| $C_{10}$+ aromatics | 0.4 | 2.0 | 7.4 | 6.2 | 8.4 | 11.3 | 1.2 | 3.9 | 6.9 | 1.4 | 2.8 | 4.8 | 6.6 | 4.4 |
| Yield [1] | 16.0 | 26.6 | 40.8 | 43.1 | 46.9 | 44.0 | 27.0 | 48.1 | 55.8 | 13.3 | 26.4 | 30.2 | 32.7 | 28.8 |
| Selectivity [2] | 24.0 | 33.4 | 46.9 | 48.7 | 52.9 | 49.6 | 39.9 | 55.8 | 63.0 | 27.1 | 39.3 | 39.8 | 41.3 | 39.8 |

[1] Grams of new aromatics formed per 100 g. of charge.
[2] Yield divided by grams of $C_5$+ non-aromatics converted/100 grams of charge.

The above table clearly illustrates the novel process of this invention as well as showing the effect of temperature and space velocity on the products which are obtained.

At the outset, it is well to point out that the charge material in all cases contain 40.5 weight percent olefins so that it was possible to carry out the reaction at a lower temperature than would be possible if a substantially paraffinic feed material had been used. As can be seen in Examples 24 and 25, production of new aromatics in an amount of at least 30 weight percent based on the non-aromatic portion of the charge stock was obtained. However, it is also significant to note that at the higher temperatures, i.e. Examples 13 through 18, increased amounts of aromatics were produced. This was due primarily to the fact that at the higher temperatures the paraffins which were contained in the feed material also were converted to aromatics whereas at the lower temperatures, the aromatic content came primarily from converting the olefins to aromatics. It is also interesting to note that as the space velocity went up, i.e. Example 13, the reaction was driven more towards olefins and less towards aromatics. It has been found that if the space velocity is still further increased beyond the critical ranges recited in the specification, that olefins will be produced in an ever-increasing manner. If it was desired to produce olefins at the expense of aromatics then the severity at which the conversion is carried out should be decreased, i.e. the WHSV should be increased beyond the ranges set forth in this specification. This phenomenon is also shown in Example 22 wherein the high space velocity drove the reaction more towards olefins rather than aromatics and an undesirable yield of aromatics was produced.

The effect of incorporating zinc in an acid H–ZSM–5 is also illustrated in that higher selectivities were obtained when using the zinc H–ZSM–5 as opposed to using H–ZSM–5.

Examples 27–31

These examples are directed towards evaluating H–ZSM–5 admixed with various metals including hydrogenation/dehydrogenation metals and compounds thereof. In all cases the catalytic mixture was evaluated for converting n-pentane at 1 atmosphere, at temperatures of about 1050° F. and at varying space velocities.

The catalysts used in all the examples were mixtures of H–ZSM–5 and the following substances.

Example 27—35 weight percent $Al_2O_3$
Example 28—nothing (100% H–ZSM–5)
Example 29—30 weight percent Cr/Al
Example 30—0.60 weight percent zinc
Example 31—exchanged nickel ZSM–5, about 0.8% Ni, mixed with 35% alumina The results, as well as additional operating conditions are shown in the following table:

| Example | 27 | 28 | 29 | 30 | 31 |
|---|---|---|---|---|---|
| WHSV | 1.0 | 1.0 | 0.67 | 0.67 | 0.82 |
| Temperature, °F | 1,070 | 1,040 | 1,050 | 1,050 | 1,000 |
| Conversion, wt. percent | 98.2 | 98.3 | 91.4 | 100 | 100 |
| Yield [1] | 30.8 | 31.1 | 26.7 | 43.2 | 49.5 |
| Selectivity [2] | 31.3 | 31.7 | 29.1 | 43.2 | 49.5 |

[1] Yield = Grams aromatics/100 grams charge.
[2] Selectivity = $\frac{\text{Yield} \times 100}{\text{weight percent conversion}}$ Examples 32–37

These examples will illustrate that the method of associating a desired metal with the H–ZSM–5 is not critical and includes both base exchange and impregnation techniques.

Catalyst A was prepared by base exchanging H–ZSM–5 with zinc.

Catalyst B was prepared by impregnation of H–ZSM–5 with zinc nitrate followed by calcination at 1000° F. The amount of zinc nitrate used was that sufficient to provide the final catalyst with 1% by weight of zinc.

Catalyst C was prepared in a manner similar to that of Catalyst B except that more zinc nitrate was used. The final catalyst analyzed 8% by weight of zinc.

Catalysts A, B and C were evaluated for the production of aromatics utilizing n-hexane as charge. All examples were carried out at 1000° F. and at atmospheric pressure. Results are shown below:

| | Examples | | | | | |
|---|---|---|---|---|---|---|
| | 32 | 33 | 34 | 35 | 36 | 37 |
| Catalyst | A | B | B | B | C | C |
| WHSV | 1.4 | 1.4 | 0.7 | 2.8 | 1.4 | 0.7 |
| Product, wt. percent: | | | | | | |
| $H_2$ | 4.0 | 3.3 | 4.3 | 4.0 | 2.6 | 2.9 |
| Methane | 10.0 | 7.2 | 11.3 | 6.9 | 10.6 | 15.3 |
| Ethylene | 1.5 | 2.3 | 1.3 | 5.6 | 0.5 | 0.0 |
| Ethane | 13.1 | 7.7 | 13.5 | 6.6 | 24.0 | 29.5 |
| Propylene | 1.4 | 2.1 | 1.3 | 6.2 | 1.5 | 6.2 |
| Propane | 10.9 | 20.1 | 11.3 | 12.6 | 9.3 | 3.0 |
| $C_4$'s | 1.6 | 3.6 | 0.5 | 6.2 | 1.1 | 0.4 |
| $C_5$'s | 0.5 | 0.7 | 0.4 | 1.8 | 0.3 | 0.4 |
| $C_6$'s | 0.0 | 0.0 | 0.0 | 1.2 | 0.1 | 0.0 |
| Coke | 0.6 | 1.6 | 1.8 | 0.7 | 0.7 | 0.9 |
| Aromatics: | | | | | | |
| $C_6$ | 17.1 | 10.6 | 15.7 | 12.2 | 16.3 | 18.3 |
| $C_7$ | 21.5 | 22.4 | 24.1 | 20.1 | 16.7 | 17.8 |
| $C_8$ | 10.5 | 12.7 | 10.4 | 11.7 | 10.3 | 7.7 |
| $C_9$ | 0.7 | 1.1 | 0.8 | 1.2 | 0.3 | 0.3 |
| $C_{10}$ | 0.8 | 1.4 | 1.1 | 1.4 | 0.8 | 0.7 |
| $C_{11}$+ | 3.9 | 2.1 | 3.6 | 2.0 | 4.5 | 6.3 |
| Total yield of aromatics | 54.5 | 50.3 | 55.70 | 48.6 | 48.9 | 51.10 |
| Selectivity, percent | 55 | 51 | 56 | 48 | 51 | 51 |

As can be seen from the above table, excellent results were obtained in all cases.

Examples 38–44

These examples will illustrates the use of platinum in varying amounts in conjunction with ZSM–5 zeolites.

The catalysts were prepared by impregnating H–ZSM–5 with platinum chloride followed by activation. The catalysts were then evaluated for aromatizing hexane at 1000° F., 2.8 WHSV and atmospheric pressure.

Results, as well as catalyst descriptions are shown in the following table:

| Example | Pt, wt. percent | Pretreatment | Aromatic selectivity |
|---|---|---|---|
| 38 | 0.04 | $H_2/H_2S$ | 30 |
| 39 | 0.10 | Air | 31 |
| 40 | 0.10 | Regeneration, Air | 30.5 |
| 41 | 0.10 | Air plus $C_6H_{11}Cl$ | 29 |
| 42 | 0.35 | $H_2/H_2S$ | 30 |
| 43 | 0.35 | Regeneration, $H_2/H_2S$ | 32 |
| 44 | 0.35 | Air | 31.5 |

Examples 45–54

The following examples will illustrate the vast superiority of the ZSM-5 type family of zeolites for the aromatization of a light $C_4$-180° naphtha.

In this series of examples various catalysts were evaluated for aromatizing the light $C_4$-180° naphtha at atmospheric pressure and in the absence of added hydrogen.

Results and additional operating conditions are shown below:

The product obtained was found to contain 32.5 grams of aromatics/100 grams of charge.

Example 56

A mixture of n-$C_6$, n-$C_7$ and n-$C_8$ paraffins were contacted with H–ZSM–5 at 932° F., atomspheric pressure, no added hydrogen and 3 LHSV.

The results are as follows:

Aromatics/gram/100 g. of charge:

| | |
|---|---|
| $C_6$-aromatic | 4.9 |
| $C_7$ | 22.9 |
| $C_8$ | 2.4 |
| $C_8+$ | 1.2 |
| Total aromatics | 31.4 |

Conversion, wt. percent:

| | |
|---|---|
| $C_6$ | 98 |
| $C_7$ | 99 |
| $C_8$ | 99 |

TABLE

| Catalyst description | Example 45 | 46 | 47 | 48 | 49 | 50 | 51 | 52 | 53 | 54 | Analysis of charge stock |
|---|---|---|---|---|---|---|---|---|---|---|---|
| | Eri-onite | Zn-Eri-onite | Mor-denite | Zn-Mor-denite | H-Beta | Zn-Beta | ZSM-12 | Zn-ZSM-12 | H-ZSM-5 | Zn-ZSM-5 | |
| Temperature, °F | 1,000 | 1,000 | 1,000 | 1,000 | 1,002 | 997 | 1,006 | 1,022 | 995 | 980 | |
| WHSV | 1 | 1 | 1 | 1 | 1 | 1 | 1 | 0.9 | 0.82 | 0.82 | |
| Time on stream (min.) | 12 | 12 | 55 | 20 | 30 | 65 | 45 | 35 | 45 | 177 | |
| Total product dist., wt. percent: | | | | | | | | | | | |
| $C_1$ | 7.2 | 8.2 | | | 16.2 | 3.3 | 2.8 | 3.1 | 11.2 | 10.5 | |
| $C_2=$ | 2.8 | 0.3 | | | 1.3 | 2.3 | 4.9 | 5.1 | 3.4 | | |
| $C_2$ | 9.6 | 15.6 | | | 14.1 | 3.7 | 6.4 | 3.5 | 16.0 | 18.3 | |
| $C_3=$ | | | | | | | | | | | |
| $C_3$ | 28.1 | 17.5 | | | 51.2 | 7.9 | 26.1 | 14.6 | 16.5 | 4.8 | |
| iso-$C_4$ | 1.5 | 1.1 | | | 0.2 | 1.8 | 4.7 | 3.1 | .1 | | 0.5 |
| Iso- and butene-1 | 0.1 | | | | 1.9 | 1.6 | 1.3 | 2.3 | .1 | | |
| N-$C_4$ | 2.1 | 0.4 | | | | 10.6 | 10.2 | 11.0 | .2 | | 8.4 |
| Trans-$C_4$ | 0.1 | | | | | 1.3 | 0.6 | 1.4 | | | |
| Cis | 0.1 | | | | | 1.0 | 0.5 | 1.1 | | | |
| Iso-$C_5$ | 21.5 | 23.8 | | | | 6.8 | 8.4 | 2.6 | | | 16.1 |
| N-$C_5$ | 0.6 | | | | | 26.3 | 14.5 | 22.6 | | | 2.81 |
| Pentene-2 | | | | | | 0.1 | | 0.2 | | | |
| 2,2-DM-$C_4$ | 0.5 | 0.3 | | | | 1.2 | 0.2 | 0.9 | | | 0.6 |
| Cyclo-$C_5$ | 0.9 | 1.1 | | | | | | | | | 1.0 |
| 2,3-DM-$C_4$ | 1.3 | 1.3 | | | | 1.0 | 0.4 | 0.5 | | | 1.1 |
| 2-M-$C_5$ | 10.2 | 10.8 | | | | 1.3 | 2.4 | 0.1 | | | 7.6 |
| 3-M-$C_5$ | 5.4 | 6.0 | | | | 1.0 | 1.2 | 0.1 | | | 4.5 |
| Hexene-1 | | | | | | | | | | | |
| N-$C_6$ | 0.1 | | | | | 8.7 | 2.0 | 5.9 | | | 11.7 |
| Hexene-2 | | | | | | 0.1 | | | | | |
| M-cyclo-$C_5$ | | | | | | | | | | | 2.8 |
| $C_6H_6$ | 0.9 | 1.7 | | | 10.8 | 7.7 | 4.1 | 6.2 | 16.4 | 18.0 | 1.7 |
| Cyclo-$C_6$ | 1.0 | 1.6 | | | | 1.1 | | 0.5 | | | 2.4 |
| i-$C_7$'s | 1.3 | 1.5 | | | | | 0.5 | | | | 7.4 |
| N-$C_7$ | 3.5 | 6.6 | | | | 1.4 | | 0.4 | | | 3.2 |
| Toluene | | | | | | 3.6 | 6.5 | 4.7 | 7.2 | 20.5 | 25.0 |
| i-$C_8$'s | | 0.4 | 1.1 | | | | | | | | 3.0 |
| N-$C_8$ | | 0.9 | 1.1 | | | | | | | | 0.5 |
| Et-$C_6H_5$ | | | | | | 0.5 | 0.2 | 0.5 | 0.6 | 0.2 | |
| M-p-xylene | | | | | | 1.7 | 2.0 | 3.6 | 6.3 | 8.9 | |
| O-xylene | | | | | | 0.4 | 0.5 | 1.1 | 2.9 | 3.1 | |
| $C_9$'s paraffins | | | | | | | | | | | |
| $C_9$'s Ar | | | | | | 0.4 | 0.2 | 1.2 | 1.2 | 0.9 | |
| $C_{10}$-$C_{12}$ paraffins | | | | | | | | | | | |
| $C_{10-12}$ paraffins | | | | | | | | | | | |
| $C_{10}$-$C_{12}$ Ar | | | [Cat. probably aged] | | | Severity could be increased | | | | | |
| $C_{12}+$'s paraffins | | | [almost immediately] | | | to 90+% conversion | | | | | |
| $C_{12}+$'s Ar | | | | | 0.8 | 0.4 | 1.4 | 1.4 | 5.7 | 10.3 | |
| Total, wt. percent conversion | 58.0 | 55.7 | 15 | 10 | 97.4 | 40.5 | 59.1 | 55.5 | 97.4 | 97.6 | |
| Wt. percent Ar made/100 gm. charge | 0 | 0.8 | | | 12.7 | 15.2 | 10.6 | 18.7 | 50.3 | 62.3 | |

The above table clearly shows the unique ability of ZSM-5 type catalysts to produce aromatics at very high yields.

Example 55

This example will illustrate the aromatization of a Udex Raffinate over a H–ZSM–5 catalyst.

The feed material was a highly paraffinic $C_5$-$C_9$ Udex Raffinate and it was passed over a mixture of H–ZSM–5 and 20 weight percent alumina at the following conditions:

| | |
|---|---|
| Temperature, °F. | 932 |
| P.s.i.g. | 0 |
| $H_2$/HC | 0 |
| LHSV | 2.6 |

Example 57

A zinc exchanged H–ZSM–8 was calcined 16 hours in air at 550° C. and then treated with hydrogen for 1 hour at 550° C.

The Zn/H–ZSM–8 zeolite was then contacted with n-hexane at 932° F. atmospheric pressure, and in the absence of added hydrogen and the results showed that 39 weight percent of the n-hexane was converted to aromatics.

Example 58

The procedure of Example 57 was repeated with the exception that n-heptane was the feed.

Results showed that 32 weight percent of the n-heptane was converted to aromatics.

Example 59

The procedure of Example 58 was repeated with the exception that n-octane was the feed.

Results showed that 36 weight percent of the n-octane was converted to aromatics.

Examples 60-62

These examples, 60-62, will illustrate the critical minimum temperatures which are necessary to obtain the high aromatic yields of this invention.

In these examples, three different feeds were used so as to illustrate the effect of feed composition and minimum critical temperatures. Additionally, ZSM-5 type zeolites were used with and without a hydrogenation/dehydrogenation component so as to study their effect on temperature.

The feeds are identified as follows:

|  | Raffinate | Naphtha | F.C.C. gasoline |
|---|---|---|---|
| Boiling range. °F | 140-250 | $C_6$-360 | $C_5$-230 |
| Weight percent: |  |  |  |
| Paraffins | 81.3 | 46.8 | 35.9 |
| Olefins | 4.1 | 0.3 | 37.1 |
| Naphthenes | 9.8 | 40.8 | 15.8 |
| Aromatics | 4.8 | 11.9 | 10.9 |

Each of the above feeds was then contacted with H-ZMS-5 as well as with zinc H-ZSM-5 at a space velocity of 1 and at various temperatures in an attempt to find the lowest minimum critical temperature which would be necessary in order to produce at least 30 grams of aromatics per 100 grams of feed material. The results of said experimentation were as follows:

|  | Lower temperature limit | |
|---|---|---|
| Feed | H-ZSM-5 | Zn H-ZSM-5 |
| Raffinate | 900 | 760 |
| Naphtha | 835 | 725 |
| F.C.C. | 650 | 750 |

The results shown in the above table clearly illustrate that the minimum critical temperature which is necessary to obtain the results of this invention will vary not only with the particular cations which are associated with the ZSM-5 type aluminosilicate, but also with the content of the feed materials. As has heretofore been pointed out, the easiest feed materials to convert to aromatics are olefins, the next easier are naphthenes, and the most difficult are paraffins. In the case of H-ZSM-5 this is clearly illustrated by the minimum temperatures which are set forth in that the paraffins required the highest temperature and the olefins the lowest temperatures. For reasons which are not quite understood, the analogy does not appear to hold for zinc H-ZSM-5. As can be seen, when using this type of zeolite the minimum temperature in all cases was about the same, i.e. 750° F.

As a practical matter in carrying out the process of this invention, the temperature which is chosen can be ascertained by routine experimentation for any specific feed material and any specific ZSM-5 type catalyst which is desired to be employed. However, as pointed out earlier, in all cases, it has been found that the severity which is required is that which is sufficient to give at least 90% conversion of the non-aromatic portion of the feed material.

Example 63

This example describes the preparation of the ZSM-5 used in Examples 1-6.

A solution of 266 pounds of sodium silicate (28.5 weight percent $SiO_2$, 8.8% $Na_2O$, balance water) and 292 pounds of water was continuously mixed with a second solution containing 19 pounds $Al_2(SO_4)_3 \cdot XH_2O$ (16.7 weight percent $Al_2O_3$), 34 pounds tetrapropylammonium hydroxide, 21 pounds of $H_2SO_4$, 97 pounds of NaCl and 495 pounds water in a mixing nozzle. The resultant gelatinous precipitate was discharged from the nozzle into an agitated 120 gallon vessel. The vessel was heated to 210° F. and held for 7 days while agitating at 29 r.p.m. The product was 90% ZSM-5 by X-ray diffraction. Chemical analysis of the product showed $SiO_2/Al_2O_3$ of 35.3. The crystallized product was separated from its mother liquor by centrifugation, then washed essentially free of soluble salts. The washed cake was dried at 250° F. A portion of the dried cake was calcined three hours at 700° F. in air. After cooling, the product was exchanged five times, one hour each at room temperature using 5 cc. of 5% $NH_4Cl/gm$. of dry product. The product was washed free of soluble chlorides then dried two hours at 230° F.

Example 64

This example describes the preparation of ZSM-5 used in Examples 7-18 and 22-26.

A solution composed of 84.4 pounds of sodium silicate (28.5 weight percent $SiO_2$, 8.8 weight percent $Na_2O$, balance water) and 49.0 pounds of water was continuously mixed with a second solution containing 2.70 pounds of $Al_2(SO_4)_3 \cdot xH_2O$ (16.7% weight $Al_2O_3$), 7.04 pounds of $H_2SO_4$, 15.8 pounds of NaCl and 50.0 pounds of $H_2O$ in a mixing nozzle. The resultant gelatinous precipitate was discharged from the nozzle into an agitated 30 gallon autoclave. After the gel had been charged to the autoclave it was thoroughly whipped, then 5.68 pounds of tri-n-propylamine, 4.88 pounds of n-propylbromide and 9.40 pounds of methylethylketone were added. The autoclave was then sealed and heated to 250° F. and held there for 15.5 hours without agitation. The temperature was subsequently raised to 320° F. with agitation supplied by a high shear impeller at 315 r.p.m. After 5 hours at 320° F. the product was analyzed as 105% ZSM-5 by X-ray diffraction. Chemical analysis of the product showed $SiO_2/Al_2O_3$ of 71.0. The crystallized product was separated from its mother liquor by filtration, washed free of soluble salts and dried at 250° F. The dried ZSM-5 was blended with hydrated alpha-$Al_2O_3 \cdot H_2O$ and water in a muller mixer to obtain an extrudable mixture. The ZSM-5 and $Al_2O_3$ were blended in proportions to give 65% weight ZSM-5 35% weight $Al_2O_3$ in the final product. The mixture was then extruded through $\frac{1}{16}''$ opening die and dried at 250° F. in air. The dried extrudate was then calcined for three hours at 1000° F. in $N_2$. After cooling the extrudates were ion exchanged with 0.2 N $NH_4NO_3$ solution for one hour at room temperature using 10 cc. of solution/gram of dried extrudate. The extrudates were subsequently washed and dried at 250° F. in air.

Example 65

This example illustrates the preparation of Zn-H-ZSM-5 used in Examples 19-21 and 32.

A solution composed of 94.5 pounds of sodium silicate (28.5 weight percent $SiO_2$, 8.8 weight percent $Na_2O$, balance water) and 54.9 pounds of water was continuously mixed with a second solution containing 3.02 pounds of $Al_2(SO_4)_3 \cdot xH_2O$ (16.7% weight $Al_2O_3$), 7.88 pounds of $H_2SO_4$, 17.7 pounds of NaCl and 56.0 pounds of $H_2O$ in a mixing nozzle. The resultant gelatinous precipitate was discharged from the nozzle into an agitated 30 gallon autoclave. After the gel had been charged to the autoclave it was thoroughly whipped and then 6.36 pounds of tri-n-propylamine, 5.47 pounds of n-propylbromide and 10.5 pounds of methylethylketone were added. The autoclave was then sealed and heated to 250° F. and held there for 17.5 hours without agitation. The temperature was subsequently raised to 320° F. with agitation supplied by a high shear impeller at 315 r.p.m. After 4.3 hours at 320° F. the product was analyzed as ZSM-5 by X-ray diffraction. Chemical analysis of the product showed $SiO/Al_2O_3$ of 71.8. The crystallized product was separated from its mother liquor by filtration then washed essentially free of soluble salts. The washed filter cake was dried at about 250° F. A portion of the dried filter cake was then blended with hydrated alpha-$Al_2O_3 \cdot H_2O$ and additional $H_2O$ in a muller mixer to obtain a mass of extrudable consistency The ZSM-5 and the $Al_2O_3$ were blended in proportions to give 65% ZSM-5 and 35% $Al_2O_3$ in the final product. The blended mixture was then extruded through 1/16" opening die plate using an angle type extruder. The extrudate was then dried at about 250° F. in air and then calcined for three hours at 1000° F. (70 grams in nitrogen atmosphere and 40 grams in 5% $O_2$, 95% $N_2$ atmosphere).

After cooling the extrudate was ion exchanged with 0.2 N $NH_4NO_3$ solution for 1 hour at room temperature using 10 cc. of solution/gram of dried extrudate. The extrudate was washed and then ion exchanged with 1.0 N $ZnCl_2$ solution for four hours at 190° F. using 5 cc. of solution per gram of dried extrudate. The extrudates were washed free of soluble chlorides then dried at 1250° F. and calcined three hours at 1000° F. in air.

Example 66

This example describes the procedure for preparing the catalyst of Example 27.

A solution composed of 240 pounds of sodium silicate (28.5 weight percent $SiO_2$, 8.8 weight percent $Na_2O$, balance water) and 300 pounds of water was continuously mixed with a second solution containing 7.3 pounds of $Al_2(SO_4)_3 \cdot xH_2O$ (16.7 weight percent $Al_2O_3$), 30 pounds of tetrapropylammonium bromide, 20 pounds of $H_2SO_4$, 90 pounds of NaCl and 410 pounds of $H_2O$ in a mixing nozzle. The resultant gelatinous precipitate was discharged from the nozzle into an agitated 120 gallon vessel. The vessel was heated to 210° F. and held for 8 days while agitating at 24 r.p.m. The product was ZSM-5 by X-ray diffraction. Chemical analysis of the product showed $SiO_2/Al_2O_3$ of 67.0. The crystallized product was washed essentially free of soluble salts by decantation, then filtered. The washed filter cake was dried at about 250° F. A portion of the dried filter cake was then blended with hydrated alpha-$Al_2O_3 \cdot H_2O$ and additional $H_2O$ in a muller mixer to obtain a mass of extrudable consistency. The ZSM-5 and the $Al_2O_3$ were blended in proportion to give 65% ZSM-5 and 35% $Al_2O_3$ in the final product. The blended mixture was then extruded through 1/16" opening die plate using a ram type extruder. The extrudate was then dried at about 250° F. in air and then calcined for three hours at 700° F. in air. After cooling, the extrudate was ion exchanged four times, one hour each with 5% $NH_4Cl$ solution at room temperature using 5 cc. of solution/gm. of dried extrudate. The extrudate was washed free of soluble chlorides then dried at 250° F.

Example 67

This example illustrates the preparation of the catalyst used in Example 28.

A solution composed of 160 pounds of sodium silicate (28.5 weight percent $SiO_2$, 8.8 weight percent $Na_2O$, balance water) and 200 pounds $H_2O$ was prepared in a 120-gallon stirred tank. A solution of 20 pounds tetrapropylammonium bromide and 100 pounds $H_2O$ was made and added to the tank. A solution of 858 grams $NaAlO_2$ (44.3% $Al_2O_3$, 30.3% $Na_2O$), 58 grams NaOH and 50 pounds $H_2O$ was prepared and added to the tank. A solution of 16 pounds $H_2SO_4$ and 50 pounds $H_2O$ was made and added to the tank. A solution of 60 pounds NaCl and 72 pounds water was made and added to the tank. 0.5 pounds of ZSM-5 cake from a similar preparation was added. The tank was heated while stirring to 207–212° F. for eight days. The product was analyzed as 95% ZSM-5 by X-ray diffraction. Chemical analysis showed $SiO_2/Al_2O_3$ of 71.4. The product was filtered and washed four times with $H_2O$.

200 grams of the above—49.2% solids—were dried 16 hours at 105° C. 100 grams were calcined at 700° F. for 30 hours. The same was $NH_4$ exchanged in 5 N $NH_4Cl$ (13 ml./g.) by refluxing 16 hours; then four hours in fresh solution. The sample was washed free of chloride ion, dried at 105° C., and 40 grams were calcined by programming 1° C./minute from room temperature to 1000° F. and holding 10 hours at that temperature.

Example 68

The catalyst of Example 54 was prepared as follows:
A solution of 42.2 pounds of sodium silicate (28.5 weight percent $SiO_2$, 8.8 weight percent $Na_2O$, balance water) in 52.8 pounds of water was continuously mixed in a mixing nozzle with a second solution of 1.44 pounds of $Al_2SO_4 \cdot xH_2O$ (16.7 weight percent $Al_2O_3$), 3.52 pounds of $H_2SO_4$ (95 weight percent), and 15.8 pounds of NaCl in 72.2 pounds of water. The resulting gelatinous precipitate was discharged from the nozzle into an agitated 30-gallon autoclave to which was then added 2.84 pounds of tri-n-propylamine. With continuous agitation at 121 r.p.m., the autoclave was heated to 320° F. and held at that temperature for 23.5 hours. The crystallized product was filtered from its mother liquor, washed essentially free of soluble salts and dried at about 230° F. One pound of that product was heated for three hours at 700° F. in a porcelain dish covered with a watch glass to decompose the organic cations in it. The product was then base exchanged at 190° F. by five one-hour contacts, each with five ml. of 5% $NH_4Cl$ solution per gram of solid (700° F. calcined basis). The resulting $NH_4$ form of the ZSM-5 was filtered from its mother liquor, water washed at room temperature until substantially free of chloride ions, and dried at 230° F. for 68 hours. Fifty grams of this product (<0.01 weight percent Na) was then base exchanged at 190° F. by one four-hour contact with a mixture of 1300 ml. of 0.5 N $ZnCl_2$ and 450 ml. of 0.5 $NH_4Cl$. The resulting product was filtered from its mother liquor, washed until substantially free of chloride ions, dried 23 hours at 230° F. and pelleted. The pellets were crushed to a size range of 14–25 mesh, and then calcined by heating to 1000° F. at 2° F./minute followed by 10 hours at 1000° F. This final product was analyzed and found to contain 0.77 weight percent Zn and to have a surface area (BET) of 365 m.²/gram.

Example 69

The catalyst of Example 55 was prepared as follows:
Solution A was made by dissolving 0.56 pounds of sodium aluminate (44.7% $Al_2O_3$) in 14.00 pounds of water. Solution B was made by dissolving 44.70 pounds of sodium silicate (28.5 weight percent $SiO_2$, 8.8 weight percent $Na_2O$, balance water) in 56.00 pounds of water. Solution C was made by dissolving 5.60 pounds of tetra-n-propylammonium bromide in 28.00 pounds of water. Solution D was made by dissolving 4.47 pounds of $H_2SO_4$ (97 weight percent) in 14.00 pounds of water. Solution C was poured into solution B while stirring. Solution A was then poured into the mixture of C and B while stirring. Solution D was then poured into the mixture of C, B and A while stirring. A firm gel was formed which was partially broken up by agitation with a stirrer and paddles. pH was 9.8. The reaction mixture was then stirred at 200–210° F. for 167 hours. The solid product was then separated from its mother liquor, washed substantially free of chloride ions, and oven-dried at 230° F. The dried material was identified as 90% crystalline ZSM-5 by X-ray. It was then calcined for 10 hours in air at 1000° F. A portion of the calcined material (303.2 grams) was base exchanged at room temperature by four one-hour contacts, each of which was with 303.2 grams NH₄Cl dissolved in 5760 cc. of water. The product was separated from its mother liquor, washed substantially free of chloride ions, dried at 230° F. to give a product containing 92.4 weight percent solids having a sodium content of 0.1–0.2 weight percent. A portion of the dried product (27.6 grams) was mixed in a muller mixer for 20 minutes. To the mixer was added 8.22 grams of Continental Oil Company $Al_2O_3$ (mostly alpha-monohydrate, 77.6 weight percent solids). After 20 minutes of mixing, a solution of 0.319 grams of acetic acid in 3.19 grams of water was added to the mixer. After 10 minutes of mixing, 22.0 grams of water was added to the mixer during a period of half-an-hour. After half-an-hour's further mixing, the resulting material was extruded in a hydraulic extruder with 12 tons load to product 1/16" diameter extrudate in one pass. The extrudate was then dried for three hours at 230° F., and calcined in air by heating to 1000° F. at 2° F./minute followed by 10 hours at 1000° F.

Example 70

The catalyst of Example 56 was prepared as follows: 30.2 grams $NaAlO_2$ (44.5 weight percent $Al_2O_3$, 30.1 weight percent $Na_2O$) was dissolved in 1025 ml. 2.18 N tetrapropylammonium hydroxide at about 100° C. with stirring. To this, added 720 grams Ludox (30 weight percent $SiO_2$) rapidly with stirring, mixed five minutes. A thick, gelatinous precipitate formed immediately. The gel was placed in a Pyrex liner in a one gallon autoclave, heated to 300° F., and held for eight days with no stirring. The crystallized product was separated from its mother liquor by filtration and washed with 3 liters $H_2O$. The resultant product was 80% ZSM-5 by X-ray diffraction. Chemical analysis showed a $SiO_2/Al_2O_3$ of 21.4. The washed cake was dried at 230° F., then calcined in air for 16 hours at 1000° F. After cooling, the product was exchanged three times, 2 hours each treat at about 70° C. with excess saturated NH₄Cl solution. The product was filtered, washed free of soluble chlorides and dried 16 hours at 230° F.

Example 71

The catalysts of Examples 57–59 were prepared as follows:
14.0 grams $NaAlO_2$ (44.5 weight percent $Al_2O_3$, 30.1 weight percent $Na_2O$) was dissolved in 300 grams tetraethylammonium hydroxide (40% in $H_2O$) and 300 ml. $H_2O$. To this, added 1000 grams Ludox (30 weight percent $SiO_2$) and stirred 10 minutes. A thin, gelatinous precipitate was formed. The gel was placed in a one liter Parr autoclave, heated to 380° F. with stirring, and then held six days at 380° F. with no stirring. The crystallized product was separated from its mother liquor by filtration and washed with 2 liters $H_2O$. The washed cake was then dried at 230° F. The crystallized product showed good crystallinity by X-ray diffraction and the chemical analysis showed a $SiO_2/Al_2O_3$ of 94.2. The dried product was calcined in air for 16 hours at 1000° F. After cooling to room temperature, the product was exchanged three times; 2 hours each treat at about 80° C. with 1 liter of 25 weight percent NH₄Cl solution. This product was filtered and washed free of soluble chlorides, then dried for 16 hours at 230° F. After cooling to room temperature, this product was exchanged two times, 2 hours each treat at about 80° C. with 500 ml. 0.25 N NH₄Cl, ZnCl₂ solution. The product was filtered and washed free of soluble chlorides. The exchanged zeolite was dried 16 hours at 230° F., then pelleted and screened 30–60 mesh.

What is claimed is:

1. A process for producing aromatic compounds which comprises contacting a normally liquid hydrocarbon having a boiling range of from $C_5$ to an upper limit wherein at least 50 volume percent boils no higher than 250° F. and consisting essentially of paraffins, olefins, naphthenes and mixtures thereof with a crystalline aluminosilicate zeolite of the ZSM-5 type having a composition in terms of mole ratios of oxides as follows:

$$0.9 \pm 0.2\ M_{2/n}O:Al_2O_3:YSiO_2:zH_2O$$

wherein M is at least one cation having a valence $n$, Y is at least 5 and $z$ is between 0 and 40, and having the characteristic X-ray diffraction pattern set forth in Table 1 of the specification at a pressure of from atmospheric to 35 atmospheres, a space velocity of from 1 to 15 WHSV and at a temperature which is sufficient to convert 90% of the non-aromatic portion of the feed and to produce at least 30 grams of aromatics per 100 grams of feed material charged.

2. The process of claim 1 wherein the feed material contains at least 35 weight percent olefins and the minimum critical temperature is 650° F.

3. The process of claim 2 wherein the feed material contains less than 35 weight percent olefins and the minimum critical temperature is about 900° F.

4. A process for producing aromatic compounds which comprises contacting a normally liquid hydrocarbon having a boiling range of from $C_5$ to an upper limit wherein at least 50 volume percent boils no higher than 250° F. and consisting essentially of paraffins, olefins, naphthenes and mixtures thereof with ZSM-5 type zeolite as defined in claim 1 which has been zinc exchanged at a pressure of from atmospheric to 35 atmospheres, a space velocity of from 1 to 15 WHSV, and at a minimum temperature of about 750° F.

5. A process for producing aromatic compounds which comprises contacting a normally liquid hydrocarbon having a boiling range of from $C_5$ to an upper limit wherein at least 50 volume percent boils no higher than 250° F. and consisting essentially of paraffins, olefins, naphthenes, and mixtures thereof with a ZSM-5 type crystalline aluminosilicate zeolite having a composition in terms of mole ratios of oxides as follows:

$$0.9 \pm 0.2\ M_{2/n}O:Al_2O_3:YSiO_2:zH_2O$$

wherein M is at least one cation having a valence $n$, Y is at least 5 and $z$ is between 0 and 40, and having the characteristic X-ray diffraction pattern set forth in Table 1 of the specification at a minimum pressure of from atmospheric to 35 atmospheres, a space velocity of 1 to 15 WHSV and at a minimum temperature of 650° F. when the feed material contains at least 35 weight percent olefins and a minimum temperature of 900° F. when the feed material contains less than 35 weight percent olefins.

6. The process of claim 5 wherein the temperature and space velocity is such that at least 90 weight percent of the non-aromatic portion of the feed is converted and the aromatics produced are at least 30 weight percent based on the feed.

7. The process of claim 6 wherein the ZSM-5 zeolite has been base exchanged with hydrogen ions, or ammonium ions or mixtures thereof.

8. The process of claim 7 wherein a hydrogenation/dehydrogenation component is associated with the base exchanged ZSM-5 zeolite.

9. The process of claim 8 wherein the ZSM-5 type zeolite has zinc, or hydrogen ions or ammonium ions or mixtures thereof associated therewith and the minimum temperature is 750° F. regardless of olefin content.

10. The process of claim 6 wherein the ZSM-5 type zeolite is ZSM-5.

11. The process of claim 6 wherein the ZSM-5 type zeolite is ZSM-8.

12. The process of claim 6 wherein the feed is a normally liquid hydrocarbon boiling from $C_5$ to 210° F.

13. The process of claim 9 wherein the ZSM-5 type zeolite is ZSM-5.

14. The process of claim 9 wherein the ZSM-5 type zeolite is ZSM-8.

15. The process of claim 9 wherein the feed is a normally liquid hydrocarbon boiling from $C_5$ to 210° F.

References Cited
UNITED STATES PATENTS

| | | | |
|---|---|---|---|
| 3,409,682 | 11/1968 | Mitsche | 208—138 |
| 3,541,001 | 11/1970 | Hirschler | 260—673 |
| 3,542,671 | 11/1970 | Pollitzer | 208—138 |
| 2,971,904 | 2/1961 | Gladrow et al. | 208—135 |
| 2,971,903 | 2/1961 | Kimberlin et al. | 208—119 |

DELBERT E. GANTZ, Primary Examiner

J. W. HELLWEGE, Assistant Examiner

U.S. Cl. X.R.

208—138, 139, 141; 260—673

PO-1050
(5/69)

UNITED STATES PATENT OFFICE
CERTIFICATE OF CORRECTION

Patent No. 3,756,942          Dated September 4, 1973

Inventor(s) JOHN CATTANACH

It is certified that error appears in the above-identified patent and that said Letters Patent are hereby corrected as shown below:

| | |
|---|---|
| Column 3, line 72, | "in" should be --is--. |
| Column 12, line 4, | Temperature, °F under Example 21, "2,022" should be --1,022--. |
| Column 12, line 56, | Propylene, under Example 35, "6.2" should be --5.2--. |
| Column 13, line 40, | Trans-$C_4$-" should be --Trans-$C_4$= --. |

Signed and sealed this 16th day of April 1974.

(SEAL)
Attest:

EDWARD M. FLETCHER, JR.
Attesting Officer

C. MARSHALL DANN
Commissioner of Patents